Figure 1:
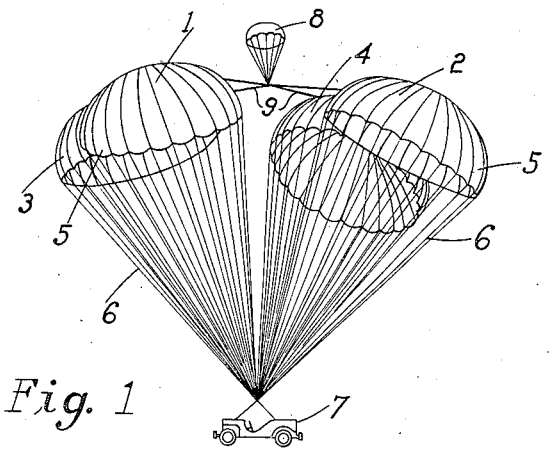
Figure 6:
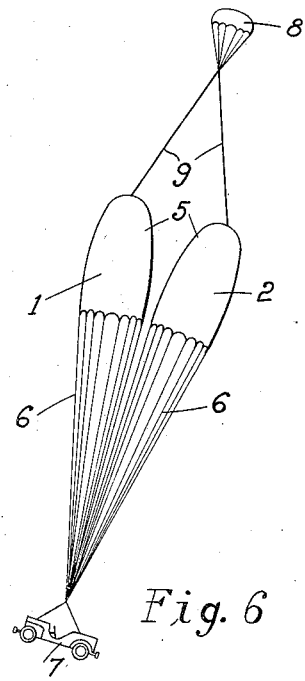

May 27, 1947.  P. F. SMITH  2,421,167
PARACHUTE CLUSTER
Filed June 19, 1945

INVENTOR.
PREVOST F. SMITH
BY
ATTORNEY.

Patented May 27, 1947

2,421,167

UNITED STATES PATENT OFFICE 2,421,167

PARACHUTE CLUSTER

Prevost F. Smith, San Diego, Calif.

Application June 19, 1945, Serial No. 600,321

8 Claims. (Cl. 244—142)

This invention relates to a parachute cluster such as is used for lowering a heavy load from an airplane.

In parachute clusters as heretofore used the arrangements, for the most part at least, have been such that the individual parachutes would not open substantially simultaneously but a part thereof, usually one, would open in advance of the opening of the others. The parachute, or parachutes, thus opening in advance of the others receives the entire impact of the falling load or cargo and provides the sole control thereof until the other parachutes open. Consequently it has been found necessary to construct the parachutes of very strong heavy material so that any one of them will withstand the impact of the cargo. As a result the cluster is very heavy, very bulky and very expensive to construct.

In one standard parachute cluster the edge portion of the fabric of each parachute is attached to the edge portions of the fabric of the adjacent parachutes, by what is known as a "skirt tie." This does not facilitate the simultaneous opening of the several parachutes but, to the contrary, the opening of the parachute which first catches the air retards the opening of the other parachutes and the parachutes open successively, thus permitting the cargo to descend at excessive speed until all the parachutes are open and making it necessary to drop the cargo from a relatively high altitude. Not infrequently one or more of the parachutes will fail to open and the cargo will land with destructive force.

In another type of parachute cluster a pilot parachute is used to withdraw the main parachutes from the pack, the suspension lines of the pilot parachute being connected directly with the tops, or apices, of the main parachutes by a weak connection which is broken by the impact of the cargo, thus disconnecting the main parachutes one from the other and from the pilot parachute. Such an arrangement does not cause the main parachutes to open simultaneously but the parachute or parachutes which first catch the air will open in advance of the others. Further, such an arrangement permits the main parachutes to move to widely separated positions in which they do not have their maximum supporting value.

One object of the invention is to provide a parachute cluster in which all the main parachutes will open substantially simultaneously.

A further object of the invention is to provide a parachute cluster in which the opening of the main parachute which first catches the air is retarded in a manner to facilitate the opening of the other main parachutes.

A further object of the invention is to provide a parachute cluster including a pilot parachute which is so connected with the main parachutes that it retards the opening of the main parachute which first catches the air.

A further object of the invention is to provide such a parachute cluster in which the pilot parachute serves both to decelerate the descent of the cargo and to retard the opening of the main parachute which first catches the air.

A further object of the invention is to provide a parachute cluster in which the main parachutes, when open, are retained in closely spaced relation one to the other to increase the effective area of the cluster.

Other objects of the invention may appear as the cluster is described in detail.

In the accompanying drawings Fig. 1 is a perspective view of a parachute cluster embodying the invention and showing the several parachutes in fully opened cargo supporting positions; and Figs. 2 to 6 are side elevations of the cluster showing two only of the main parachutes and showing the same in positions which they successively assume after being dropped from the airplane.

In these drawings I have illustrated one embodiment of the invention but it is to be understood that this embodiment is chosen for the purpose of illustration only and that the cluster as a whole as well as the several parts thereof may take various forms without departing from the spirit of the invention.

In the form here shown the cluster comprises four main parachutes, 1, 2, 3 and 4, each including the fabric 5 and the suspension lines 6 by which the fabric is connected with the cargo 7. The cargo is here shown as a small automobile but it may, of course, be of any desired character. A pilot parachute 8, of substantial size with realtion to the main parachutes, is strongly connected with the main parachutes in spaced relation thereto. The connection between the pilot parachute and the main parachutes may be of any suitable character but it is preferably in the nature of a flexible bridle and is here shown as comprising strong relatively long lines 9 each connected at one end with the suspension lines of the pilot parachute and at the other end with the top center or apex of one of the main parachutes. The main parachutes and the pilot parachute are initially folded in a pack which is so supported by the cargo that it will fall with the cargo when the latter is dropped from the airplane 10.

The cargo may be supported on or in the airplane in the usual or any suitable manner. In the present instance the cargo is releasably supported beneath one of the wings of the airplane but the supporting means is not shown as it forms no part of the present invention. The pilot parachute is connected with the airplane by a severable connection, preferably a line 11 of sufficient strength to withdraw the pilot parachute from the pack but of such weakness that the connection will be broken when subjected to the weight or pull of the main parachutes and cargo.

Figure 2:
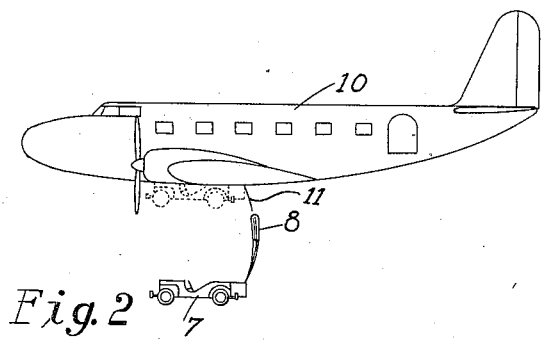
Figure 3:
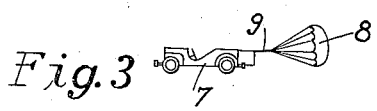
Figure 4:
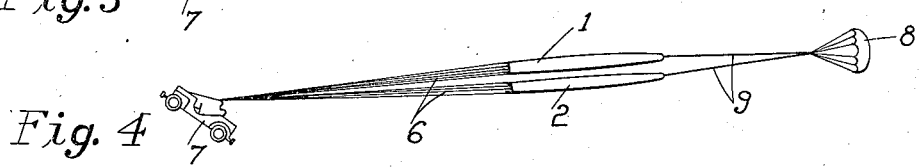
Figure 5:
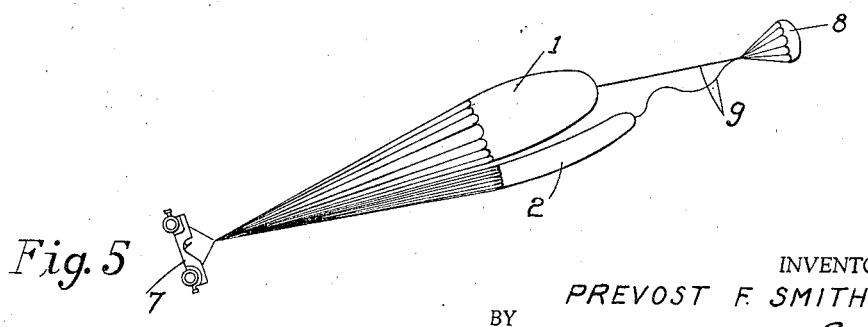

As shown in Fig. 2 the cargo has just been dropped from the airplane and has fallen far enough to withdraw the pilot parachute from the pack and to break the connection between the same and the airplane, but the pilot parachute has not yet opened. In Fig. 3 the pilot parachute has caught the air and extends to the rear of the cargo, which of course is moving forwardly and downwardly at a rate of speed determined by the speed of the airplane at the time the cargo was dropped and the weight of the cargo and the main parachutes. In Fig. 4 the pilot parachute has withdrawn the main parachute from the pack and extended the same for their full lengths, the closed parachutes and the bridle lines 7 forming a taut connection between the cargo and the pilot parachute. At the instant this connection became taut the pilot parachute received the impact of the cargo and materially reduced the velocity of the cargo, as indicated by the position to which the cargo has moved. In Fig. 5 the parachutes are still in a line at a sharp angle to the horizontal and parachute 1 has caught the air and has opened slightly. This tendency of parachute 1 to open has reduced the overall length of the partially open parachute and thus reduced the distance between the pilot parachute and the cargo. Due to this reduced distance between the pilot parachute and the cargo the parachutes which have not caught the air and their bridle lines are slackened and these parachutes are free to open and do open very quickly. After all the parachutes have begun to open they move to substantially the positions shown in Fig. 6 and quickly spread to their fully extended positions, as shown in Fig. 1, thus quickly providing full support for the cargo and distributing the weight of the latter substantially equally between the several main parachutes so that the load then moves downwardly at a slow rate of speed and lands without excessive shock.

It will be noted that the bridle lines are of substantially equal length and the combined length of two lines is such as to permit the parachutes to fully open and to assume positions slightly spaced one from the other but to so restrict the lateral or radial movement of the parachutes with relation one to the other that they are retained at all times in the positions in which they have their greatest supporting value. Further, in these positions the spacing between adjacent parachutes is such that the air passing between the same is so retarded that the effective area of the cluster has a diameter approximately equal to the full diameter of the cluster, thereby greatly increasing the supporting value of the cluster.

It will be apparent therefore that the pilot parachute receives the first impact of the falling cargo, materially reduces the velocity thereof and retards the opening of the main parachute which first catches the air until all the other main parachutes have begun to open. Due to this retardation the several main parachutes open substantially simultaneously very soon after the cargo has been dropped and the speed of the cargo is quickly reduced to a safe lowering speed. As a result the cargo can be safely dropped from an altitude much lower than is possible with parachute clusters of the type heretofore used. By limiting the relative radial movement of the main parachutes the effective area of the cluster is materially increased without increase of weight or cost. The individual parachutes, and therefore the cluster, weigh very much less than the parachutes ordinarily used in such clusters, occupy a much smaller space, cost very much less, and have a coefficient of drag substantially higher than that of the standard cluster parachutes. A forty-eight foot parachute of the type used in the standard cluster to which reference has been made weighs one hundred twenty-five pounds, has a bulk of ten cubic feet, costs about $750.00, and has a coefficient of drag of 1.67, when three or four such parachutes are included in a standard cluster. Each of the main parachutes used in the cluster herein described, when of a forty-eight foot diameter, weighs twenty-five pounds, has a bulk of two cubic feet, costs approximately $250.00, and when used in a cluster of three or four has a coefficient of drag of 2.8. A cluster of four such parachutes has safely lowered a cargo weighing 1900 pounds.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A parachute cluster comprising a plurality of main parachutes, cargo supporting means common to said main parachutes and spaced substantially equal distances from the several main parachutes, a pilot parachute, and separate means for directly connecting said pilot parachute with the apices of the respective main parachutes, said connecting means being of sufficient length to permit the full opening of each main parachute.

2. A parachute cluster comprising a plurality of main parachutes, cargo supporting means common to said main parachutes and spaced substantially equal distances from the several main parachutes, a pilot parachute, and lines of substantially equal length connecting the suspension lines of said pilot parachute with the apices of the respective main parachutes, said lines being of sufficient strength to sustain the impact of the cargo on said pilot parachute.

3. A parachute cluster comprising a plurality of main parachutes, a pilot parachute, and lines connecting the apices of the respective main parachutes with said pilot parachute, said lines being of a length sufficient to permit said main parachutes to fully open.

4. A parachute cluster comprising a plurality of main parachutes having means whereby they may be connected with a common cargo, a pilot parachute and separate lines connecting said pilot parachute with the apices of the respective main parachutes, said lines being of such relative length that said lines and the collapsed main parachutes will all be taut when first extended to their full lengths by said pilot parachute, whereby a slight opening of that parachute which first tends to open will shorten the distance between the cargo and said pilot parachute and thereby slacken the lines connecting said pilot parachute with the other main parachutes to facilitate the opening of the latter.

5. A parachute cluster comprising a plurality of main parachutes, a pilot parachute, and lines of substantially equal length connecting the main parachutes with said pilot parachute, said lines being of such length with relation to the diameter of the fully extended main parachutes as will permit said main parachutes to fully open and will limit the radial movement thereof with relation one to the other to restrict the space between adjacent parachutes.

6. A parachute cluster comprising a plurality of main parachutes having means whereby they may be connected with a common cargo in equally spaced relation thereto, a pilot parachute, and separate means for connecting said pilot parachute with and in equally spaced relation to the apices of the respective main parachutes to decelerate the movement of said cargo and to restrict the opening of the main parachute which first catches the air and cause all of said parachutes to open substantially simultaneously.

7. A parachute cluster comprising a plurality of main parachutes adapted to be folded in a pack and having means whereby they may be connected with a common cargo in equally spaced relation thereto, a pilot parachute adapted to be folded in said pack, separate means for strongly connecting said pilot parachute with the apices of the respective main parachutes in spaced relation thereto, and means for withdrawing said pilot parachute from said pack into the air stream and causing the same to withdraw said main parachutes from said pack, to decelerate said cargo and to so retard the opening of that parachute which first catches the air that the several parachutes will open substantially simultaneously.

8. A parachute cluster comprising a plurality of main parachutes, a single pilot parachute, and separate lines connecting said pilot parachute with the apices of the respective main parachutes, said lines being of sufficient strength to sustain the impact of the cargo on said pilot parachute.

PREVOST F. SMITH.

REFERENCES CITED

The following references are of record in the file of this patent:

UNITED STATES PATENTS

| Number | Name | Date |
| --- | --- | --- |
| 1,834,840 | Holt | Dec. 1, 1931 |
| 2,048,159 | Hoffman | July 21, 1936 |
| 2,032,824 | Adams | Mar. 3, 1936 |
| 1,394,201 | Lemon | Oct. 18, 1921 |